(12) United States Patent
Yoo et al.

(10) Patent No.: US 8,217,794 B2
(45) Date of Patent: Jul. 10, 2012

(54) ACTIVE RFID SYSTEM FOR PORT LOGISTICS USING MULTI-HOP COMMUNICATION AND COMMUNICATION METHOD IN THE SYSTEM

(75) Inventors: Young-Hwan Yoo, Dongnae-Gu (KR); Jin-Hwan Kim, Suyeong-gu (KR)

(73) Assignee: Pusan National University Industry-University Cooperation Foundation, Busan (KR)

( * ) Notice: Subject to any disclaimer, the term of this patent is extended or adjusted under 35 U.S.C. 154(b) by 338 days.

(21) Appl. No.: 12/566,391

(22) Filed: Sep. 24, 2009

(65) Prior Publication Data
US 2010/0194544 A1 Aug. 5, 2010

(30) Foreign Application Priority Data
Feb. 2, 2009 (KR) .................... 10-2009-0007966

(51) Int. Cl.
*G08B 13/14* (2006.01)
(52) U.S. Cl. ............. 340/572.1; 340/539.1; 340/539.13; 340/3.41; 340/10.1; 340/10.2; 235/384; 235/385; 342/384; 342/385; 367/6
(58) Field of Classification Search .................. None
See application file for complete search history.

(56) References Cited

U.S. PATENT DOCUMENTS

| | | | | |
|---|---|---|---|---|
| 3,733,602 A | * | 5/1973 | Cuckler et al. | .................. 342/27 |
| 5,565,858 A | * | 10/1996 | Guthrie | ...................... 340/10.33 |
| 7,629,886 B2 | * | 12/2009 | Steeves | ...................... 340/572.1 |
| 2004/0174260 A1 | * | 9/2004 | Wagner | ...................... 340/568.1 |
| 2008/0099557 A1 | * | 5/2008 | James | ........................... 235/385 |
| 2008/0204243 A1 | * | 8/2008 | Backes et al. | ............. 340/572.1 |
| 2010/0278087 A1 | | 11/2010 | Kawakami et al. | |

FOREIGN PATENT DOCUMENTS

| | | |
|---|---|---|
| JP | 2006-287520 A | 10/2006 |
| JP | 2006-345414 A | 12/2006 |
| JP | 2008-056405 A | 3/2008 |
| KR | 10-2006-0033279 A | 4/2006 |
| KR | 10-2007-0065490 A | 6/2007 |
| WO | WO 2008/023638 A1 | 2/2008 |

* cited by examiner

*Primary Examiner* — Benjamin C Lee
*Assistant Examiner* — Curtis King
(74) *Attorney, Agent, or Firm* — Sherr & Vaughn, PLLC

(57) ABSTRACT

Provided are an active radio frequency identification (RFID) system for port logistics and a communication method in the RFID system in which the forms of commands and response messages in the current standard are not changed in order to maintain compatibility with the current standard and to support multi-hop communication and some fields that are not generally used are used so as to enable communication between a tag in a shadow area and a reader by multi-hop communication using other surrounding tags.

10 Claims, 7 Drawing Sheets

FIG. 4

| Command Prefix | Command Type | Owner ID | Rebrdcast Tag ID | Interrogator ID | Command Code | Parameters | CRC |
|---|---|---|---|---|---|---|---|
| 1 byte ('31') | 1 byte (8 bits) | 3 bytes | 4 bytes | 2 bytes | 1 byte | N bytes | 2 bytes |

620 — Command Type

610

| 7 | 6 | 5 | 4 | 3 | 2 | 1 | 0 |
|---|---|---|---|---|---|---|---|
| Reserved | Reserved | Reserved | Level | | | 0= Broadcast (Tag Id not present) 1= Point to Point (Tag ID present) | 0= Owner ID not present 1= Owner ID present |
| | | | | | 1 | | |

621

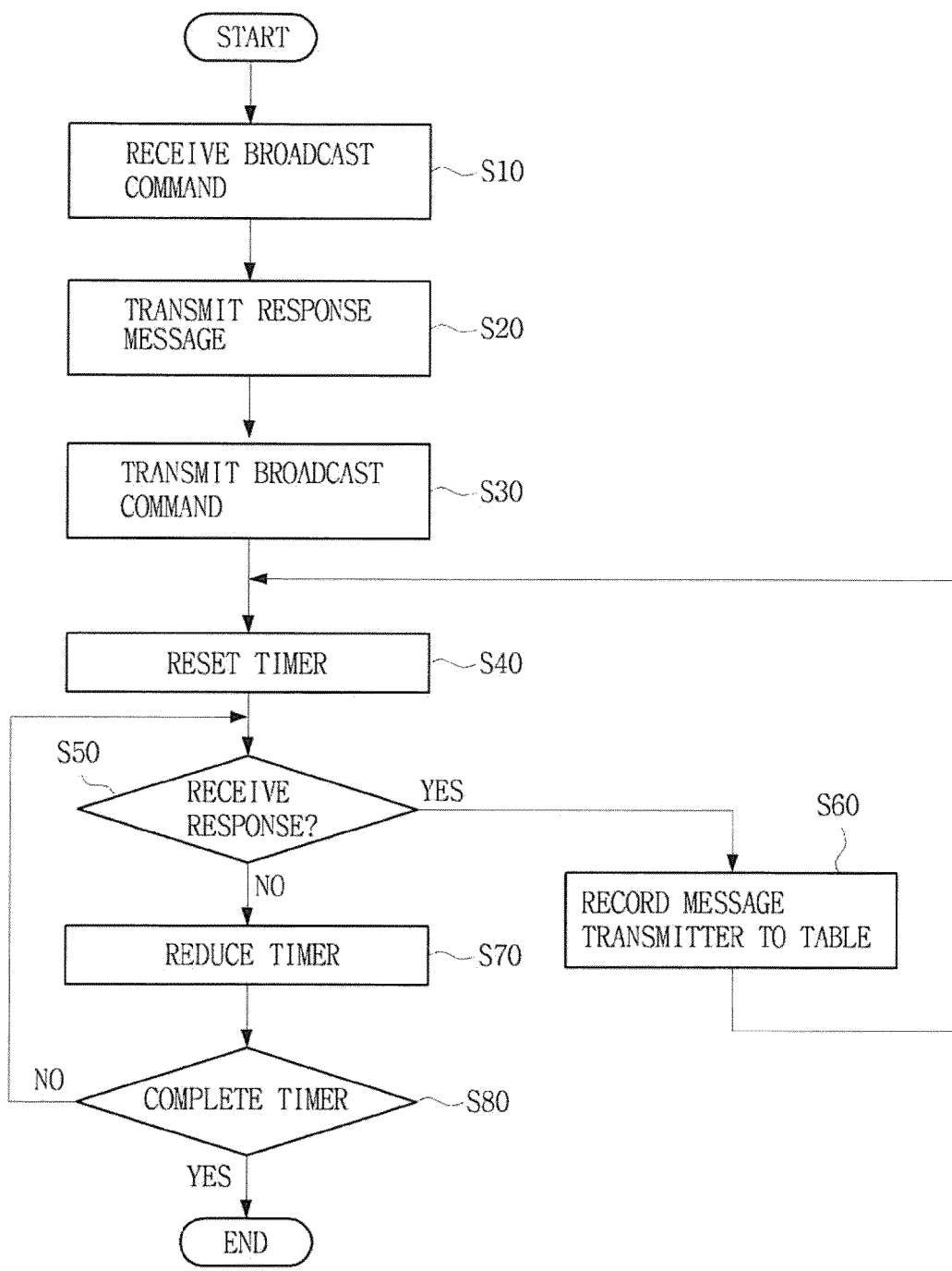
<FIG. 7>

ACTIVE RFID SYSTEM FOR PORT LOGISTICS USING MULTI-HOP COMMUNICATION AND COMMUNICATION METHOD IN THE SYSTEM

CROSS-REFERENCE TO RELATED PATENT APPLICATION

This application claims the benefit of Korean Patent Application No. 10-2009-0007966, filed on Feb. 2, 2009, in the Korean Intellectual Property Office, the disclosure of which is incorporated herein in its entirety by reference.

BACKGROUND OF THE INVENTION

1. Field of the Invention

The present invention relates to efficient processing and state management of containers and various equipments in ports, and more particularly, to an active radio frequency identification (RFID) system for port logistics and a communication method in the RFID system for improving the tag recognition rate when active RFID tags having a frequency of 433 MHz are attached to each item and tag information is collected by using a reader.

2. Description of the Related Art

A radio frequency identification (RFID) system mainly used in port logistics is an active RFID communication system based on a frequency of 433 MHz and conforms to the international standard, International Standardization Organization/International Electrotechnical Commission (ISO/IEC) 18000-7. Such a standard defines various command packets of a reader, which can be classified into a broadcast command and a peer-to-peer (P2P) command, and defines the form of response messages of the tag with respect to the commands. In U.S. electronic seal (e-seal) tags have been studied for tracing flowing of imported and exported items and strengthening security of goods. In some ports in U.S and Europe, active tags having a frequency of 433 MHz are attached to containers and equipments in the ports so as to be used as a model for automating processes of identifying, shipping, and loading each item.

Currently, in order to identify and trace items in ports, workers carry terminals such as personal digital assistants (PDAs), identify the existence and state of the items by hand, and transmit information to a server through a wireless local area network (LAN) installed in the ports. If the workers are skilled, accurate information may be collected and maintained through the above processes. However, personnel expenses may increase and the state of the items that are changed every hour may not be rapidly identified.

In this regard, a RFID technology that has currently been highlighted may solve such problems above. That is, if RFID tags are attached to each container and a collection command is sent to the RFID tags by using a reader, information of each RFID tag may be automatically collected through wireless radio. Thus, it is possible to rapidly cope with unexpected circumstances where items are damaged or stolen without checking one by one by the workers.

FIG. 1 is a view for describing an operation of a current RFID standard system.

Referring to FIG. 1, a command of a reader 100 is transmitted to surrounding tags by wireless and the tags transmit response messages including their own information to the reader 100. Then, the reader 100 provides the response messages received from the tags to a manager terminal 500 through a server 400 so that a manager may identify the existence and state of items at a long distance. However, a fifth tag 200, which cannot receive a signal from the reader 100, may exist due to an obstacle (wall) 300. In this case, the manager may have difficulties in identifying the existence and state of items.

For example, if the wall 300, which interrupts a radio wave flowing between the reader 100 and the fifth tag 200, exists, the fifth tag 200 may not receive a signal from the reader 100 and thus may not respond to the reader 100. Then, the reader 100 may not recognize the existence of the fifth tag 200.

An area where a signal of the reader 100 does not reach is called as a shadow area. In container ports, metal containers are loaded in four columns and five rows and large-sized equipments such as cranes and yard tractors are scattered so that there is a strong probability that the shadows are generated due to an interruption of radio wave by the containers or the large-sized equipments. In particular, the recognition distance of the active tags having a frequency of 433 MHz used in port logistics is known as 50-100 m. However, in special environments such as ports, the recognition distance is actually less than 50-100 m and vanes according to the loaded form of the items.

As such, if the information of all tags is not completely recognized in the reader 100, serious problems may occur and affect the efficiency of the entire port logistics. That is, containers in which their types, destinations and existence are not accurately recognized may adversely affect the stored form, shipping, and loading scheduling of the entire containers. This is because the current international standard (ISO/IEC 18000-7) for communication using active tags having a frequency of 433 MHz for port logistics is defined only for direct communication between a reader and a tag and is not appropriate to support multi-hop communication between a reader and a tag.

Accordingly, tag information that is not recognized due to the communication shadows or instability of wireless communication needs to be recorded again by hand. Thus, the current RFID standard system does not have strong advantages compared with an environment where an existing wireless LAN is used. Accordingly, a method for solving the problem of the communication shadows is needed in the RFID technology so as to contribute to automation of the port logistics.

Current technologies for solving the problem of the communication shadows are as follows.

Firstly, a fixed-type wireless reader may be further installed in a place where the shadow is frequently generated. However, there are a number of problems in this method. One of the main problems is that the place, to which the fixed-type reader can be installed in a port, is limited. Since moving paths for yard tractors or forklifts may be secured between densely stored containers and spaces for equipments such as cranes or lifts are needed, the place, to which the reader can be installed, is limited to lighting towers located in a container storage yard. In addition, even if the fixed-type reader is installed, smooth communication between the reader and the tag may be obstructed due to metal-formed large-sized equipments and containers.

Secondly, mobile readers may be developed and introduced. The mobile readers may be attached to working vehicles in a port and the working vehicles continuously supply a power source to the mobile readers. Thus, the mobile readers collect information of tags. However, there are some problems in the mobile readers. For example, communication shadow area may be continuously generated in specific zones. In inaccessible zones, for example, most distant zones from the moving paths of the working vehicles or tags attached to containers stored at the highest place, the mobile readers may not communicate. Also, the mobile readers continuously move so that a message load is generated due to frequent changes of network topology, and stability of a network is hardly secured. In addition, a price of the mobile reader is higher by 2-3 times than that of the fixed-type reader and thus the price is another problem of the mobile readers.

Accordingly, the current RFID system in the port logistics may not solve the problems of the shadow areas that are irregularly generated. In this regard, the readers may be installed more densely; however, expenses may increase in this case and signals of the readers may collide with each other. Moreover, spaces for storing containers and moving/operating equipments have to be secured and thus spaces for installing the readers are limited.

SUMMARY OF THE INVENTION

The present invention provides an active radio frequency identification (RFID) system for port logistics and a communication method in the RFID system in which the forms of commands and response messages in the current standard are not changed in order to maintain compatibility with the current standard and to support multi-hop communication and some fields that are not generally used are used so as to enable communication between a tag in a shadow area and a reader by multi-hop communication using other surrounding tags.

The present invention also provides a RFID system for port logistics and a communication method in the RFID system which enable communication between a tag in a shadow area and a reader by multi-hop communication using other surrounding tags so as to avoid an installation of a new fixed-type reader and a purchase of a high-priced mobile reader.

The present invention also provides a RFID system for port logistics and a communication method in the RFID system which enable communication between a tag in a shadow area and a reader by multi-hop communication using other surrounding tags by modifying a protocol to enable multi-hop communication in the international standard of RFID communication for port logistics, International Standardization Organization/International Electrotechnical Commission (ISO/IEC) 18000-7 so as to have a new type of communication protocol that operates a RFID device for identifying containers and various equipments and tracing their state in a port.

According to an aspect of the present invention, there is provided an active radio frequency identification (RFID) system for port logistics using multi-hop communication, wherein the RFID system includes a reader and tags, the tags including: a command receiving unit receiving a peer-to-peer (P2P) command or a broadcast command of the reader from the reader or other tags; a response message transmitting unit transmitting own response message to the reader or the other tags which relay the P2P command or the broadcast command of the reader to the command receiving unit; a command transmitting unit retransmitting the P2P command or the broadcast command of the reader received from the command receiving unit to the other tags; a response message receiving unit receiving a response message from the tags which transmit the P2P command or the broadcast command of the reader through the command transmitting unit; a command reconstructing unit reconstructing a broadcast command by adding an ID of the tag and a level value indicating the hop count the command passes through from the reader to the broadcast command, when the command received from the command receiving unit is the broadcast command, and providing the reconstructed broadcast command to the command transmitting unit; a response message reconstructing unit reconstructing a response message by adding information for distinguishing a command retransmitted from the other tags from the received command, a level value indicating the hop count the command passes through from reader, and an ID of the tag, which transmits the command thereto, to the response message, when the broadcast command received from the command receiving unit is the command transmitted from the other tags, and providing the reconstructed response message to the response message receiving unit; and a tree-based child table recording a lower tag, which transmits the response message received from the response message receiving unit, as a child tag and a higher tag, which transmits the broadcast command received from the command receiving unit, as a parent tag, and storing a tree-based network topology.

According to another aspect of the present invention, there is provided a communication method in an active radio frequency identification (RFID) system for port logistics using multi-hop communication, wherein the RFID system comprises a reader and tags, the method including: reconstructing a broadcast command by adding an ID of the tag and a level value indicating the hop count the command passes through from the reader to a broadcast command when the broadcast command is received from the reader or other tags; transmitting the reconstructed broadcast command to lower tags; reconstructing a response message by adding information for distinguishing a command retransmitted from the other tags from the received command, a level value indicating the hop count the command passes through from reader, and an ID of the tag, which transmits the command thereto, to the standard response message when the received broadcast command is the command transmitted from the other tags; transmitting the reconstructed response message to the tag, which transmits the broadcast command; when the reconstructed response message is received from the lower tags, generating a tree-based child table by recording the lower tags, which transmit the response message, as child tags and a higher tag, which transmits the broadcast command received from a command receiving unit, as a parent tag; and executing a peer-to-peer (P2P) command received through the command receiving unit by using multi-hop communication between the tags.

The reconstructing of a broadcast command may include putting an ID of a first tag, which rebroadcasts the command, in the existing tag ID field so as to be used as a rebroadcast tag ID, and adding two bits from among the bits that are not used in a command type of the broadcast command as a level value indicating hop count the command passes through from reader.

The reconstructing of a response message may include: adding information for distinguishing the command retransmitted from the other tag from the received command to the mode field, which is the highest four bits in the standard response message; adding a level value indicating the hop count the received broadcast command passes through from reader; and adding an ID of the tag, which transmits the command thereto, to last four bytes of a data field of the response message.

The reconstructing of a response message may include: deleting the added tag ID before the tag right before the reader transmits the response message to the reader.

The executing of the P2P command may include transmitting the response message regardless of the other tags and completing a task, when the received P2P command is the P2P command, in which the destination thereof is a first tag.

The executing of the P2P command may include: checking whether a destination tag of the received P2P command exists in the child table, when the received P2P command is the P2P command, in which the destination thereof is another tag; as a result of the checking, when the destination tag exists in the child table, transmitting the received P2P command to a child tag; transmitting the P2P command to the destination tag by repeating the checking and transmitting; and when a response message is received from the destination tag, transmitting the received response message to the reader.

BRIEF DESCRIPTION OF THE DRAWINGS

The above and other features and advantages of the present invention will become more apparent by describing in detail exemplary embodiments thereof with reference to the attached drawings in which:

FIG. 4 is a view illustrating the form of a received broadcast command reconstructed in a command reconstructing unit included in the tag of FIG. 3;

FIG. 7 is a flowchart illustrating forming a tree-based network topology while processing a broadcast command in an active RFID communication method for port logistics using multi-hop communication, according to an embodiment of the present invention.

DETAILED DESCRIPTION OF THE INVENTION

Objectives, characteristics, and advantages of the present invention will be apparently described with reference to the accompanying drawings, in which exemplary embodiments of the invention are shown.

Hereinafter, an active radio frequency identification (RFID) system for port logistics using multi-hop communication and a communication method in the RFID system according to one or more embodiments of the present invention will be described with reference to the accompanying drawings. The present invention may, however, be embodied in many different forms and should not be construed as being limited to the embodiments set forth herein; rather, these embodiments are provided so that this disclosure will be thorough and complete, and will fully convey the concept of the invention to those skilled in the art. Thus, it should be understood, however, that there is no intent to limit exemplary embodiments to the particular forms disclosed, but on the contrary, exemplary embodiments are to cover all modifications, equivalents, and alternatives falling within the scope of the invention.

Figure 1:
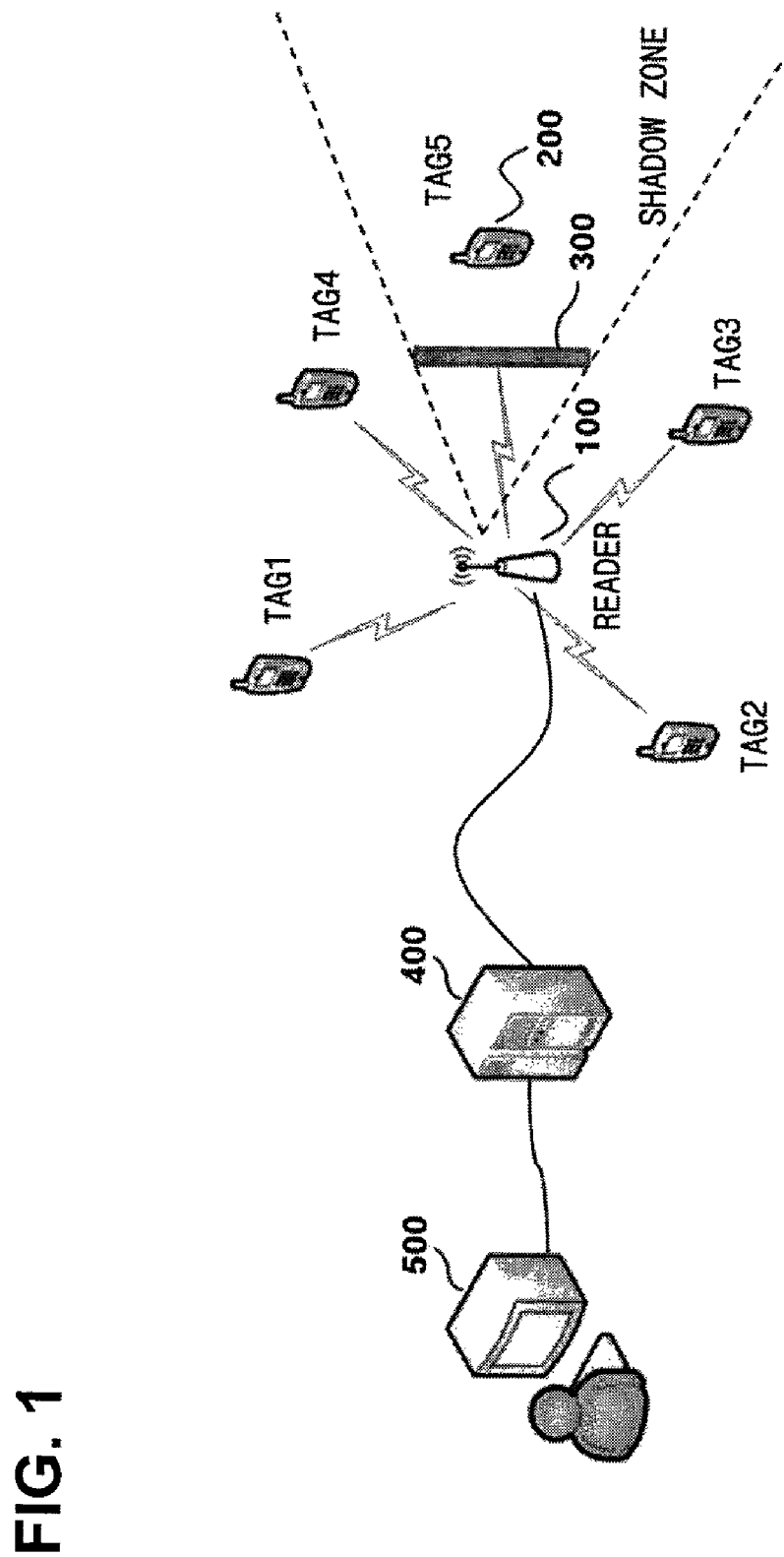
FIG. 1 is a view for describing an operation of a current radio frequency identification (RFID) standard system.
Figure 2:
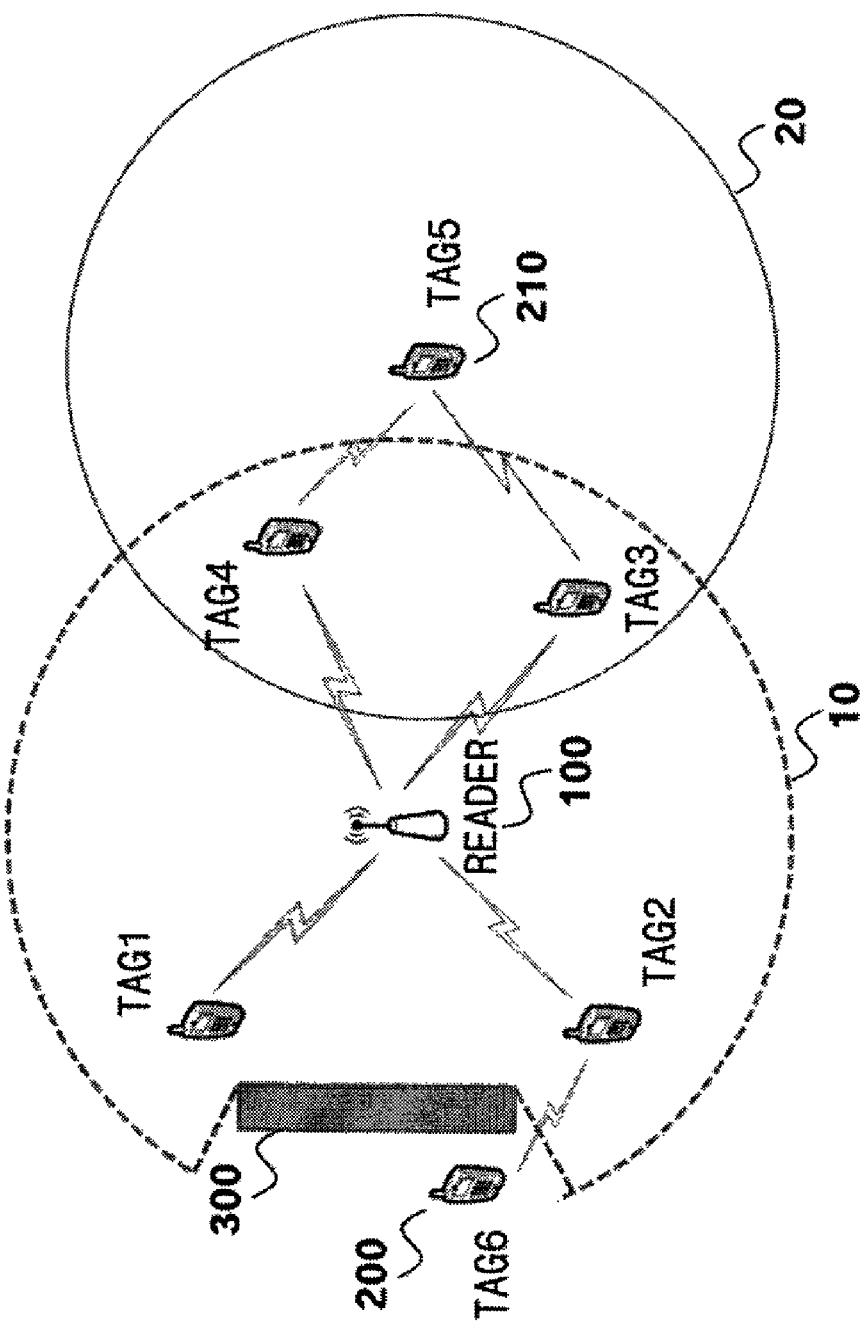
FIG. 2 is a view illustrating a network of an active RFID system for port logistics using multi-hop communication, according to an embodiment of the present invention.

FIG. 2 is a view illustrating a network of the active RFID system for port logistics using multi-hop communication, according to an embodiment of the present invention.

Referring to FIG. 2, a dotted lined circle 10 indicates a wireless radio reaching range and a solid lined circle 20 indicates a radio transmission range of a fifth tag 210. Since the fifth tag 210 is located out of a range for communicating with the reader 100 and thus may not communicate with the reader 100 based on the current standard, a third tag or a fourth tag may relay reader commands and response messages. Also, there is a wall 300, which interrupts a radio wave flowing between the reader 100 and a sixth tag 200 so that the sixth tag 200 may not directly communicate with the reader 100 and may communicate with the reader 100 through a second tag.

Accordingly, the tags may have a module for transmitting a command of the reader to the tag located in the shadow area and a module for transmitting a response message of another tag to the reader. Also, a technology for automatically forming a tree-based network topology is needed for determining moving directions of commands and response messages.

Figure 3:
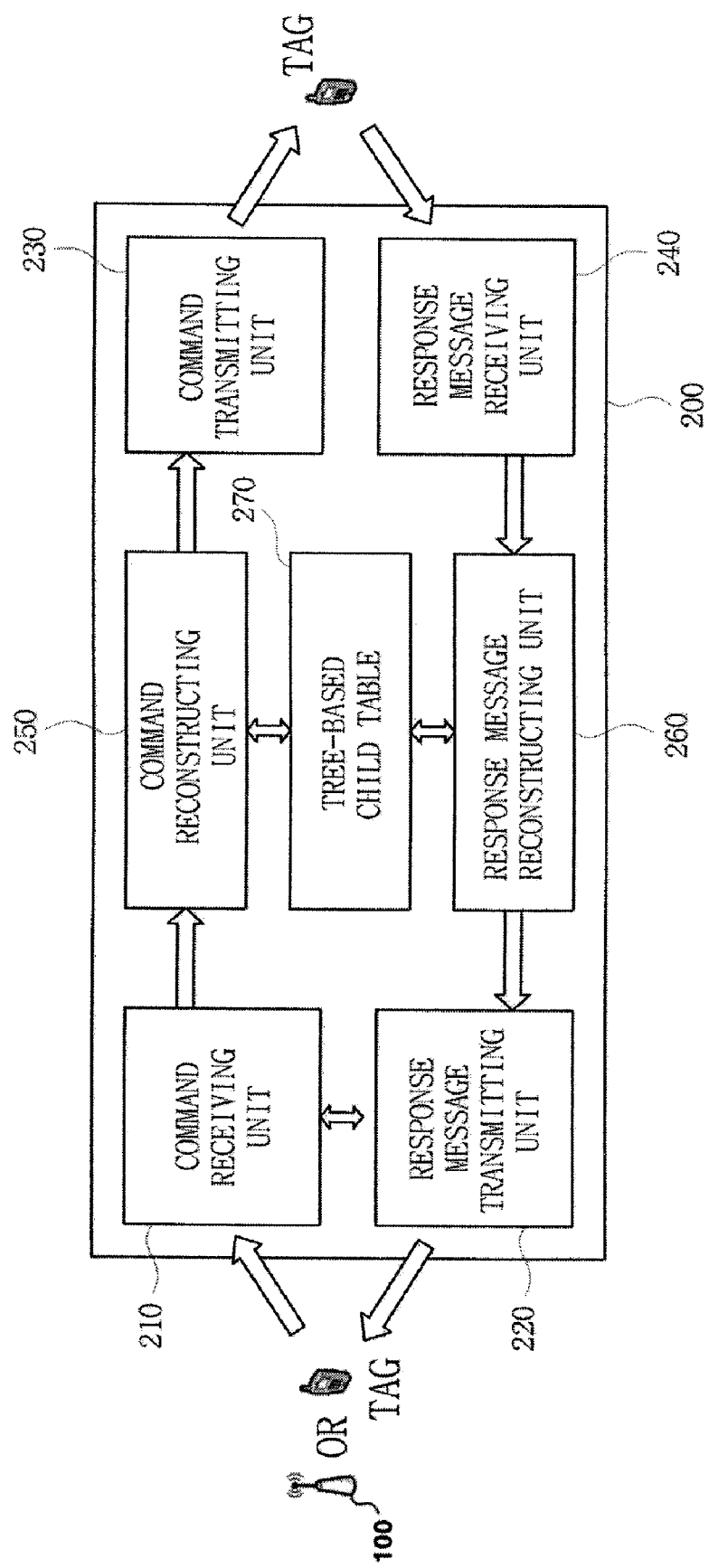
FIG. 3 is a block diagram of a tag.

FIG. 3 is a block diagram of a tag for performing functions described above.

As illustrated in FIG. 3, one tag includes a command receiving unit 210, a response message transmitting unit 220, a command transmitting unit 230, a response message receiving unit 240, a command reconstructing unit 250, a response message reconstructing unit 260, and a tree-based child table 270.

According to circumstances, if a destination tag (a first tag or a second tag in FIG. 2) may directly receive a command of the reader 100, the tag directly responds to the command of the reader 100 and thus completes a task, and if a destination tag (a fifth tag or a sixth tag in FIG. 2) may not directly receive a command of the reader 100, the tag may function as packet relaying between the reader 100 and the tag (a fifth tag or a sixth tag).

The command of the reader 100 may be classified into a peer-to-peer (P2P) command and a broadcast command, wherein the P2P command is used to instruct a specific command to a destination tag or to request state information of the destination tag and the broadcast command is used to collect tags around the reader 100. The tag may be classified into following three types according to the command of the reader 100 received from the command receiving unit 210.

Firstly, if the command of the reader 100 received from the command receiving unit 210 is the P2P command, in which the destination thereof is the corresponding tag, a tag directly transmits the response message to the reader 100 through the response message transmitting unit 220 regardless of other tags and completes the task.

Secondly, if the command of the reader 100 received from the command receiving unit 210 is the P2P command, in which the destination thereof is another tag, instead of one tag, and if the destination tag of the received P2P command exists in the tree-based child table 270, a tag transmits the received command to the command receiving unit 210 of its own child tag through the command transmitting unit 230. Then, if a response message is received in the tag from the destination tag through the response message receiving unit 240, the tag transmits the received response message to the reader 100 through the response message transmitting unit 220. In addition, if the destination tag of the received P2P command does not exist in the tree-based child table 270 of the tag, the command is ignored. The structure of the tree-based child table 270 will be described later.

Thirdly, if the command of the reader 100 received from the command receiving unit 210 is the broadcast command, a tag constructs own response message through the response message reconstructing unit 260 and responds to the reader 100 or the other tag, which transmits the command to the tag, through the response message transmitting unit 220. Then, the tag reconstructs the received command through the command reconstructing unit 250 and rebroadcasts the reconstructed command through the command transmitting unit 230.

FIG. 4 is a view illustrating the form of the received broadcast command reconstructed in the command reconstructing unit 250 of FIG. 3.

As illustrated in FIG. 4, the basic form of the received broadcast command reconstructed in the command reconstructing unit 250 is the same as the current standard, International Standardization Organization/International Electrotechnical Commission (ISO/IEC) 18000-7 and information is added to two fields that are not used during transmitting of the broadcast command.

That is, an ID of the tag, which rebroadcasts the command, is put in the existing tag ID field and is used as a rebroadcast tag ID 610, and third and fourth bits from among the bits that are not used in a command type 620 are defined as a level value 621 indicating the hop count the command passes through from the reader 100. Here, the level of the command directly received from the reader 100 is 0 and the level value 621 increases by 1 whenever passing through one hop.

The response message for the command, which directly responds to the reader 100, conforms to the message form suggested in the standard. However, some information may be added to the response message which is sent to the other higher tag. That is, the highest two bytes in the response message of the tag for the command of the reader suggested in ISO/IEC 18000-7 indicate tag status; however, contents may vary in the response message sent to the other tag, as will be illustrated in FIG. 5.

Figure 5:
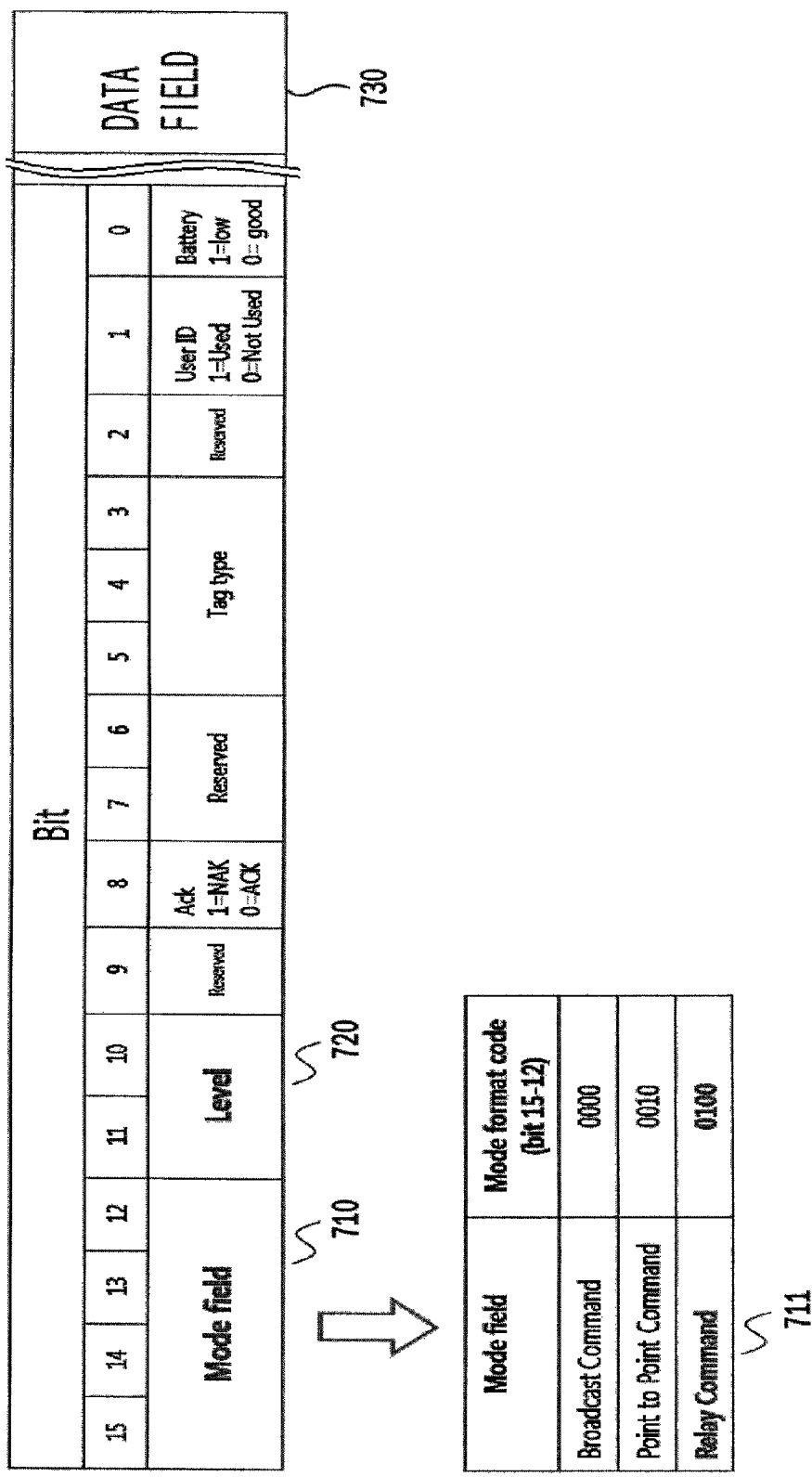
FIG. 5 is a view illustrating the form of a response message in a response message reconstructing unit sent from a tag to the other tag.

FIG. 5 is a view illustrating the form of the response message in the response message reconstructing unit 260 sent from the tag to the other tag.

Referring to FIG. 5, the highest four bits in the response message of the tag for the command of the reader are represented as a mode field 710 and indicate whether the received command is the broadcast command or the P2P command. In the present invention, a relay command 711 is added to the mode field 710 so as to distinguish the command retransmitted from the other tag from the received command directly received from the reader.

Two bits (720) after the mode field 710 are not originally used. However, a level value 720 included in the command is put in the two bits. The level value 720 is the same as the level value 621 stored in the command type 620 of the command input through the command receiving unit 210. The level value 720 indicates the hop count the command reaches. Thus, the level value 720 informs the hop count the response message passes through to reach the reader 100.

An ID of the tag, which transmits the command to the tag, is added to last four bytes of a data field 730 having a variable length existing in the standard response message, in order to indicate the destination of the response message. The added tag ID is deleted before the tag right before the reader 100 transmits the response message to the reader 100 so that communication between the tag and the reader 100 is not to changed for maintaining the compatibility with the current standard, although a communication protocol between the tags and software are slightly changed.

Each tag may identify the destination of the command transmitted therefrom. Accordingly, the tree-based child table 270 is formed by referring the response messages of lower tags while transmitting the broadcast command. As described above, the tag which receives the broadcast command, records the tag, which transmits the broadcast command, as a parent tag and transmits the response message to the parent tag.

Figure 6:
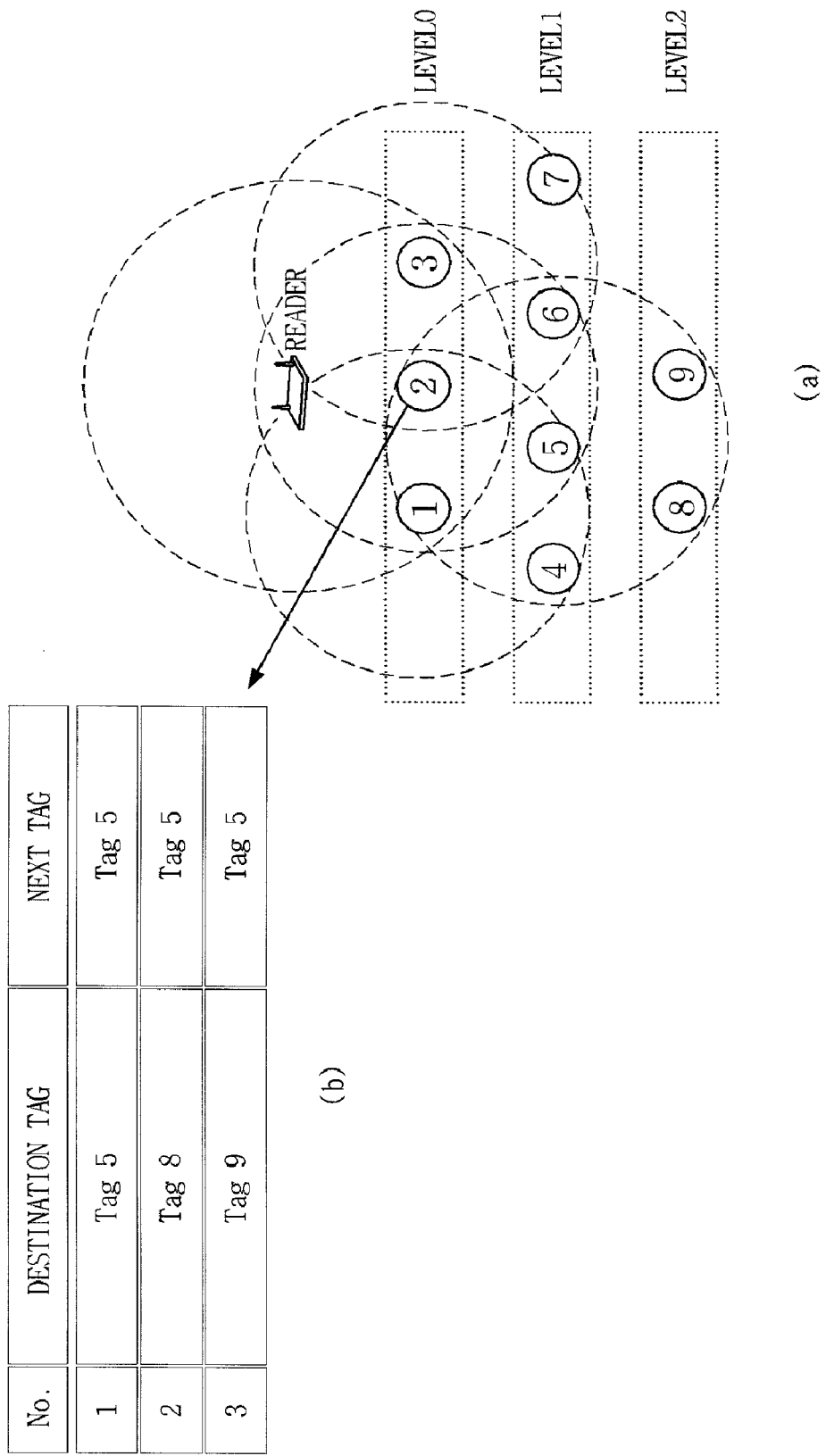
FIGS. 6A and 6B illustrate the structure of a child table.

For example, as illustrated in FIG. 6A, the fifth tag transmits the response message to the second tag and eighth and ninth tags transmit the response message to the fifth tag. Then, when the second tag receives the message from the fifth tag, fifth tag is recorded in the child table and when the second tag receives message of the eighth and ninth tags again from the fifth tag, the eighth and ninth tags are recoded in the child table. The child table of the second tag is illustrated in FIG. 6B.

As illustrated in FIG. 6B, since the fields indicating the next tags are included in each destination tag in the child table, the destination of the command may be known. In other words, due to the child table, the second tag may determine to transmit the P2P command to the fifth tag, if the second tag receives the P2P command facing the fifth tag or the eighth and ninth tags.

All tags maintain such a child table so that a tree-based network topology by using the reader as a root may be formed, as illustrated in FIG. 6A.

An operation of the active RFID system for port logistics using multi-hop communication according to the present invention will be described with reference to the accompanying drawing. Like reference numerals in FIG. 1 through FIGS. 6A and 6B denote like elements for performing the same functions.

FIG. 7 is a flowchart illustrating forming a tree-based network topology while processing the broadcast command in an active RFID communication method for port logistics using multi-hop communication, according to an embodiment of the present invention.

Referring to FIG. 7, when a first tag receives the broadcast command of the reader 100 through the command receiving unit 210, in operation S10, the first tag reconstructs own response message through the response message reconstructing unit 260 and transmits the reconstructed response message to a higher second tag or the reader 100, which transmits the broadcast command to the first tag, through the response message transmitting unit 220, in operation S20.

In the reconstructing of the response message, when the broadcast command received in the first tag is the command transmitted from the second tag, the relay command 711 is added to the mode field 710, which is the highest four bits in the response message, through the response message reconstructing unit 260 so as to distinguish the command retransmitted from the other tag from the command transmitted from the second tag. Also, the level value 621 stored in the command type 620 of the received broadcast command are stored in the two bits 720 located after the mode field 710 and thus allows to identify the hop count the reconstructed response message passes through to reach the reader 100. In addition, an ID of the tag, which transmits the command to the first tag, that is, the ID of the second tag, herein, is added to last four bytes of the data field 730 of the response message and thus the destination of the response message may be identified. Here, the added tag ID is deleted before the tag right before the reader 100 transmits the response message to the reader 100.

After the first tag reconstructs the received broadcast command through the command reconstructing unit 250, the first tag transmits the reconstructed broadcast command to the lower tags through the command transmitting unit 230, in operation S30.

In the reconstructing of the broadcast command, an ID of the first tag, which rebroadcasts the command, is put in the existing tag ID field and is used as the rebroadcast tag ID 610 and third and fourth bits from among the bits that are not used in the command type 620 are defined as the level value 621 indicating the hop count the command passes through from the reader 100. Here, the level of the command directly received from the reader 100 is 0 and the level value 621 increases by 1 whenever passing through one hop.

When the first tag receives the reconstructed response message from the lower tags, in operation S50, the lower tag, which transmit the response message, are recorded as a child tag and the higher tag, which transmits the broadcast command received from the command receiving unit, is recorded as a parent tag, so that the tree-based child table is generated, in operation S60. In the child table, the fields indicating the next tags are included in each destination tag and thus the destination of the command may be known.

A timer indicating the maximum time needed for the response message to reach is reset, in operation S40.

Then, responses from new child tags, which may further exist, are waited for the maximum time of the timer, in operation S70. When any response message is not received until the timer is expired, it is determined that there are no more child tags and collection of the tag IDs is completed, in operation S80.

Then, when the first tag receives the P2P command of the reader through the command receiving unit 210, the first tag checks whether the destination tag is included in its own child table. If the destination tag is included in the child table, the command is transmitted to a next hop tag in order to pass on to the destination tag.

In the active RFID system and the communication method in the RFID system for port logistics using multi-hop communication according to the present invention have following effects.

First, since the multi-hop communication between the RFID reader and the tags is possible, shadow area problems, which are obstacles for introducing the RFID system to a port environment, may be resolved without an additional installation cost.

Second, since a currently used wireless LAN is replaced with the RFID system for port logistics, workers do not need to check items one by one by hand, handling of the items may be rapidly performed, and personnel expenses may be significantly reduced.

Third, it is possible to rapidly cope with unexpected circumstances where items are damaged or stolen.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An active radio frequency identification system for port logistics using multi-hop communication, the radio frequency identification system comprising:
   a reader; and
   a plurality of tags, wherein the tags include a first tag including:
      a command receiving unit receiving a command selected from the group consisting of a peer-to-peer command and a broadcast command of the reader, wherein the command was issued from one selected from the group consisting of the reader and other tags;
      a response message transmitting unit for transmitting a response message to one selected from the group consisting of the reader and the other tags which transmitted the command to the command receiving unit;
      a command transmitting unit retransmitting the command received by the command receiving unit to the other tags;
      a response message receiving unit receiving a response message transmitted from the other tags which received the command retransmitted by the command transmitting unit;
      a command reconstructing unit reconstructing a broadcast command by adding an ID of the first tag which is reconstructing the command and a level value indicating the number of hops the command completed from the reader to the first tag, when the command received by the command receiving unit is the broadcast command, and providing the reconstructed broadcast command to the command transmitting unit;
      a response message reconstructing unit reconstructing a response message by adding information, the level value, and an ID of the tag which transmits the command to the command receiving unit to the response message, when the broadcast command received from the command receiving unit is the command transmitted from the other tags, and providing the reconstructed response message to the response message transmitting unit, wherein said information added to the response message is a relay command, wherein the relay command is added to a mode field, which is the highest four bits in the response message so as to distinguish a command retransmitted from the other tag from a received command, the level value added in the command reconstructing unit is stored in two bits after the mode field, and the ID of the tag, which transmits the command to the command receiving unit, is added to last four bytes of a data field of the response message; and
      a tree-based child table recording a lower tag, which transmits the response message received from the response message receiving unit, as a child tag and a higher tag, which transmits the broadcast command received from the command receiving unit, as a parent tag, and storing a tree-based network topology.

2. The active radio frequency identification system of claim 1, wherein in the command receiving unit, an ID of the tag, which rebroadcasts the command, is put in a tag ID field and is used as a rebroadcast tag ID, and two bits from among the bits that are not used in a command type are defined as a level value indicating the hop count the command passes through from reader.

3. The active radio frequency identification system of claim 1, wherein the level of a command directly received from the reader is 0 and the level value increases by 1 whenever passing through one hop.

4. The active radio frequency identification system of claim 1, wherein in the response message reconstructing unit, the added tag ID is deleted before the tag right before the reader transmits the response message to the reader.

5. A communication method in an active radio frequency identification system for port logistics using multi-hop communication, wherein the radio frequency identification system comprises a reader and tags, the method comprising:
   reconstructing a broadcast command by adding an ID of the tag and a level value indicating the hop count the command passes through from the reader to a broadcast command when the broadcast command is received from one of the reader and other tags;
   transmitting the reconstructed broadcast command to lower tags;
   reconstructing a response message by adding information for distinguishing a command retransmitted from the other tags from the received command, a level value indicating the hop count the command passes through from reader, and an ID of the tag, which transmits the command thereto, to the standard response message when the received broadcast command is the command transmitted from the other tags;

transmitting the reconstructed response message to the tag, which transmits the broadcast command;

when the reconstructed response message is received from the lower tags, generating a tree-based child table by recording the lower tags, which transmit the response message, as child tags and a higher tag, which transmits the broadcast command received from a command receiving unit, as a parent tag; and executing a peer-to-peer command received through the command receiving unit by using multi-hop communication between the tags, wherein the reconstructing of a response message comprises:

adding information for distinguishing the command retransmitted from the other tag from the received command to the mode field, which is the highest four bits in the standard response message;

adding a level value indicating the hop count the received broadcast command passes through from reader; and adding an ID of the tag, which transmits the command thereto, to last four bytes of a data field of the response message.

6. The method of claim 5, wherein the reconstructing of a broadcast command comprises putting an ID of a first tag, which rebroadcasts the command, in the existing tag ID field so as to be used as a rebroadcast tag ID, and adding two bits from among the bits that are not used in a command type of the broadcast command as a level value indicating hop count the command passes through from reader.

7. The method of claim 5, wherein the level of the command directly received from the reader is 0 and the level value increases by 1 whenever passing through one hop.

8. The method of claim 5, wherein the reconstructing of a response message comprises: deleting the added tag ID before the tag right before the reader transmits the response message to the reader.

9. The method of claim 5, wherein the executing of the peer-to-peer command comprises transmitting the response message regardless of the other tags and completing a task, when the received peer-to-peer command is the peer-to-peer command, in which the destination thereof is a first tag.

10. The method of claim 5, wherein the executing of the peer-to-peer command comprises:

checking whether a destination tag of the received peer-to-peer command exists in the child table, when the received peer-to-peer command is the peer-to-peer command, in which the destination thereof is another tag;

as a result of the checking, when the destination tag exists in the child table, transmitting the received peer-to-peer command to a child tag;

transmitting the peer-to-peer command to the destination tag by repeating the checking and transmitting; and when a response message is received from the destination tag, transmitting the received response message to the reader.

* * * * *